United States Patent [19]

Doctor et al.

[11] Patent Number: 4,824,223
[45] Date of Patent: Apr. 25, 1989

[54] PROJECTION OBJECTIVE WITH VARIABLE FOCAL LENGTH

[75] Inventors: Bernhard Docter, Wetzlar-Nauborn; Ingolf Menzel, Braunfels-Neukirchen, both of Fed. Rep. of Germany

[73] Assignee: Docter-Optic-Wetzlar GmbH, Schoffengrund, Fed. Rep. of Germany

[21] Appl. No.: 91,024

[22] Filed: Aug. 31, 1987

[30] Foreign Application Priority Data

Sep. 1, 1986 [DE] Fed. Rep. of Germany ....... 3629724
Jan. 5, 1987 [DE] Fed. Rep. of Germany ....... 3700162

[51] Int. Cl.[4] .................... G02B 15/14; G02B 15/177
[52] U.S. Cl. ...................................... 350/427; 350/423
[58] Field of Search ..................... 350/423, 426, 427

[56] References Cited

U.S. PATENT DOCUMENTS

| | | | |
|---|---|---|---|
| 3,391,973 | 7/1968 | Laurent | 350/427 |
| 3,597,048 | 8/1971 | Bertele | 350/423 |
| 3,694,056 | 9/1972 | Muszumanski et al. | 350/423 |
| 3,848,967 | 11/1974 | Grey | 350/423 |
| 3,848,968 | 11/1974 | Grey | 350/423 |
| 3,890,036 | 6/1975 | Grey | 350/427 |
| 3,924,934 | 12/1975 | Grey | 350/427 |
| 3,942,874 | 3/1976 | Besenmatter et al. | 350/423 |
| 4,018,510 | 4/1977 | Bertele | 350/423 |
| 4,099,844 | 7/1978 | Bertele | 350/427 |

*Primary Examiner*—John K. Corbin
*Assistant Examiner*—Scott J. Sugarman
*Attorney, Agent, or Firm*—Nies, Webner, Kurz & Bergert

[57] ABSTRACT

A projection objective with variable focal length is provided, consisting of a front member (F) with negative refractive power and a multiple-lens basic objective (G) with positive refractive power, between which a multiple-lens variator (V) displaceable in the direction of the optical axis and with positive refractive power is disposed, with said objective having seven self-contained lenses (L1–L7) separated from each other by air spaces and free of cemented surfaces, whereof the front member (F) consists of one single lens (L1) with negative refractive power, the basic objective consists of a Cookes or Taylor lens (L5, L6, L7) and the variator (V) likewise consists of a Cookes or Taylor lens (L2, L3, L4).

3 Claims, 1 Drawing Sheet

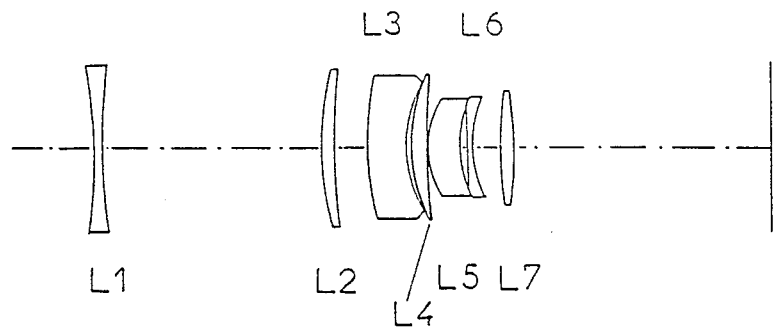
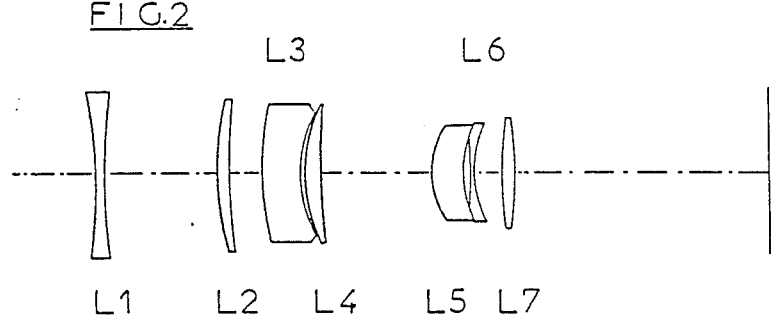
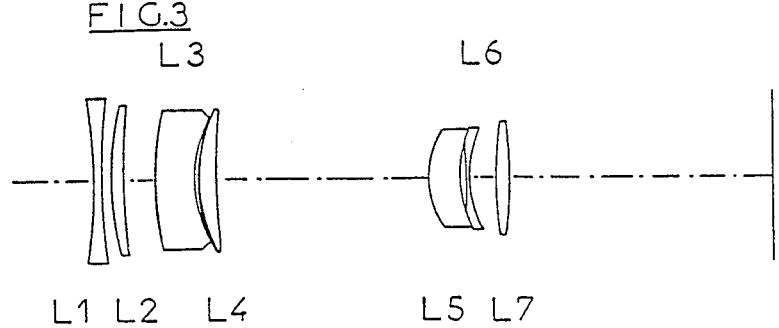

PROJECTION OBJECTIVE WITH VARIABLE FOCAL LENGTH

BACKGROUND OF THE INVENTION

This invention refers to a projection objective with variable focal length, also generally referred to as variable focus lenses, having a front member with negative refractive power and a multiple-lens basic objective with positive refractive power, between which a multiple-lens variator with positive refractive power, displaceable in the direction of the optical axis, is disposed, with the middle lens thereof having a negative refractive power.

A variety of types of variable focus lenses for slide and film projectors have become known. In general, they are derived from the essentially more complexly constructed and complicated zoom lenses for shooting cameras, which are optimized above all in favor of the image performance and are therefore correspondingly expensive. As opposed to this, up to now, variable focus lenses for projection purposes have usually been designed as simply as possible from the point of view of economics of their construction and production.

For example, in the printed German specification DE-AS No. 20 36 285, a variable focus objective consisting of only five lenses has become known, which is equipped with a minimum of lenses for economic reasons. Therefore, the variator of this previously known variable focus objective, like the front member as well, consists of only one single lens. However, such a variable focus objective does not by any means meet the demands made nowadays with regard to freedom from color defects and distortion.

A nine-lens variable focus objective of the type in question, having a variator consisting of two lenses cemented together, has become known in the German laying-open specification No. 26 14 267. Such an objective, which has a complex and costly construction not least of all due to its five-lens basic objective, distinguishes itself by improved chromatic aberration over a variable focus objective with a variator consisting of only one single lens; however, the distortion herein still reaches a relatively high level. A further disadvantage of this previously known variable focus objective consists in the use of two cemented surfaces, which requires a high production expenditure, whereby the objective becomes substantially more expensive.

A further variable focus objective of the type in question, with a two-lens variator, a front member designed as a single lens and a basic objective consisting of a Cookes or Taylor lens has become known in the German laying-open specification No. 26 26 696. In this six-lens variable focus objective, all lenses are separated from each other by air spaces and the two lenses of the variator consist of biconvex, preferably identical single lenses. In order to lower production costs, in this objective the front lens and the variator consist of plastic rather than optical glass. Therefore, it is no wonder that this known objective shows clearly visible distortions, especially in the wide-angle and telescopic settings.

Correspondingly costly variable focus objectives with thirteen, sixteen and fourteen lenses and a large number of cemented surfaces or with ten lenses and two cemented surfaces are known in the German Pat. No. 30 26 931 and the East German Pat. No. 51 130. The distortion in most of these known variable focus objectives for projection purposes shows cushion-shaped lines in the wide-angle setting and barrelshaped lines in the telescopic setting. The values for the distortions definitely amount to up to ±5% and are clearly visible during the projection. Such distortions are perceived to be disturbing, above all in fade-over projection, parallel projection or multivision.

OBJECT OF THE INVENTION

In view of this prior art, the invention is based on the task of creating a variable focus objective suitable for projection purposes, which distinguishes itself by a drastic reduction of the distortion values while on the whole displaying good image properties and freedom from color defects, and which can be produced simply and economically.

For the solution of this task it is suggested that the features given in claim 1 be provided, but that it is advantageous, to embody the variable focus objective according to the information in claim 2 or 3.

A preferred first embodiment of a variable focus objective according to the invention, with a constant, relatively small overall length, thus has a focal length of 70 to 120 mm and an aperture ratio of essentially 1:3.4. The optical data of such an objective can be found in the table of claim 2. This variable focus objective is preferably used in home projection and has a distortion of less than ±1.5% in its wide-angle and telescopic settings.

A preferred second embodiment of a variable focus objective according to the invention has a focal length of 85 to 145 mm and is preferably used for large-room projection purposes. In its wide-angle and telescopic settings this variable focus objective has a distortion of less than ±1%.

For the two aforementioned embodiments the drastically reduced distortion value in comparison with the objectives belonging to the prior art is characteristic. This very low distortion value is based in particular on the use of a variator consisting of three self-contained lenses without any cemented surface. A very high image quality is hereby guaranteed, with contrast and sharpness in particular being excellent over the entire range of the focal length. The only very slight distortion is hardly visible, so this objective is especially suited for fade-over projection, parallel projection and multivision.

A further advantage of the variable focus objective according to the invention, which is decisive especially for mass production, is that, as made clear by the example of the two preferred embodiments, one and the same variator can be used for objectives with different focal length ranges. The advantage of such a universally usable variator from the viewpoint of production is particularly that merely one single tool set is needed for this rather than a large number of tool sets.

In FIGS. 1 to 3 of the drawing a preferred embodiment of a variable focus objective is schematically represented, which is explained in more detail below.

BRIEF DESCRIPTION OF THE DRAWINGS

FIG. 1 shows the variable focus objective according to the invention in the wide-angle variator setting;

FIG. 2 shows the variable focus objective according to FIG. 1 in its normal setting, and FIG. 3 shows the variable focus objective according to FIG. 1, with the variator in the telescopic setting.

DETAILED DESCRIPTION OF THE DRAWINGS

The variable focus objective according to FIGS. 1 to 3 consists of a total of seven lenses, of which the front member F with negative refractive power consists of one single lens L1. The variator V, as well as the basic objective G, are each composed of the three lenses L2, L3, L4 and L5, L6 and L7. All lenses are in detached arrangement, i.e. air spaces are present between all lenses. Also, no lenses are cemented together.

The front member F consisting of a negative meniscal lens L1 has a more curved convex surface $r_1$ facing the objective. The variator V consisting of the three lenses L2, L3 and L4 is axially displaceable in the relatively large air space between the front lens L1 and the forward lens L5 of the basic objective G.

The basic objective G disposed on the image side consists in turn of three lenses L5, L6 and L7 likewise in detached arrangement so that air spaces are located between them. None of these lenses has a cemented surface either.

The radii of curvature $r_1$–$r_{14}$ of the lenses, as well as their axial thickness $d_1$–$d_7$ and the axial air spaces $l_1$–$l_6$ between the lenses L1–L7, and the indices of refraction of the individual lenses and their abbe's coefficient, and the type of glass of which they are made can be seen in the tables of claims 2 and 3.

The variable focus objective according to the invention in claim 2 has a continuously variable focal length range of between 70 and 120 mm, with the aperture ratio remaining essentially the same and amounting to approximately 1:3.4; it distinguishes itself by an extremely compact construction. For example, the overall length of this objective from the front surface $r_1$ of lens L1 to the rear surface $r_{14}$ of lens L7 is only 98.642 mm.

In the variable focus objective with the data according to claim 3, the continuously variable focal length range lies between 85 and 145 mm, with the aperture ratio of approximately 1:4 remaining constant for the most part. This variable focus objective as well distinguishes itself by its compact construction; the overall length here is also only 101.994 mm.

We claim:

1. A projection objective with variable focal length, having a front member (F) with negative refractive power and a multiple-lens basic objective (G) with positive refractive power, with a multiple-lens variator (V) displaceable in the direction of the optical axis and with positive refractive power being arranged therebetween, whereof the middle lens has a negative refractive power, characterized by seven self-contained lenses (L1–L7) separated from each other by air spaces and free of cemented surfaces, whereof the front member (F) consists of one single lens (L1) with negative refractive power, the basic objective (G) consists of a Cookes or Taylor lens (L5, L6, L7) and the variator (V) likewise consists of a Cookes or Taylor lens (L2, L3, L4); the improvement comprising: that said variator includes means providing that its three lenses are maintained as a unit in fixed, spaced apart relationship to each other; and that said variator as said unit is adapted to be displaced along the optical axis between a position adjacent said front member (F) and a position adjacent said basic objective (G).

2. A projection objective according to claim 1, characterized by the following construction data of an objective with a focal length range of 70–120 mm and a focal length alteration of 1:1.714 and an aperture ratio of essentially 1:3.4:

|    |          |                        | $n_d$ | $v_d$ |
|----|----------|------------------------|-------|-------|
| L1 | $r_1$    | −141.250               |       |       |
|    |          | $d_1 = 2.000$          | 1.487 | 70.41 |
|    | $r_2$    | 262.270                |       |       |
|    |          | $l_1 = 51.000$ to 2.139 |       |       |
|    | $r_3$    | 53.858                 |       |       |
| L2 |          | $d_2 = 3.500$          | 1.713 | 53.83 |
|    | $r_4$    | 205.350                |       |       |
|    |          | $l_2 = 7.000$          |       |       |
|    | $r_5$    | 57.876                 |       |       |
| L3 |          | $d_3 = 9.600$          | 1.805 | 25.43 |
|    | $r_6$    | 32.313                 |       |       |
|    |          | $l_3 = 1.105$          |       |       |
|    | $r_7$    | 45.643                 |       |       |
| L4 |          | $d_4 = 3.200$          | 1.713 | 53.83 |
|    | $r_8$    | 117.150                |       |       |
|    |          | $l_4 = 0.700$ to 49.561 |       |       |
|    | $r_9$    | 24.582                 |       |       |
| L5 |          | $d_5 = 7.600$          | 1.744 | 54.77 |
|    | $r_{10}$ | 34.227                 |       |       |
|    |          | $l_5 = 1.837$          |       |       |
|    | $r_{11}$ | −658.790               |       |       |
| L6 |          | $d_6 = 1.200$          | 1.773 | 32.21 |
|    | $r_{12}$ | 26.799                 |       |       |
|    |          | $l_6 = 6.400$          |       |       |
|    | $r_{13}$ | 81.752                 |       |       |
| L7 |          | $d_7 = 3.500$          | 1.744 | 54.77 |
|    | $r_{14}$ | −81.752                |       |       | wherein r represents the radii of curvature of the individual lenses, d their axial thicknesses, l the air spaces between the lenses, nd the indices of refraction and $v$ the abbe's coefficients of the lenses.

3. A projection objective according to claim 1, characterized by the following construction data of an objective with a focal length range of 85–145 mm and a focal length alteration of 1:1.706 and an aperture ratio of essentially 1:4:

|    |          |                        | $n_d$ | $v_d$ |
|----|----------|------------------------|-------|-------|
| L1 | $r_1$    | −149.620               |       |       |
|    |          | $d_1 = 2.000$          | 1.487 | 70.41 |
|    | $r_2$    | 237.140                |       |       |
|    |          | $l_2 = 51.000$ to 2.140 |       |       |
|    | $r_3$    | 53.858                 |       |       |
| L2 |          | $d_3 = 3.500$          | 1.713 | 53.83 |
|    | $r_4$    | 205.350                |       |       |
|    |          | $l_4 = 7.000$          |       |       |
|    | $r_5$    | 57.876                 |       |       |
| L3 |          | $d_5 = 9.600$          | 1.805 | 25.43 |
|    | $r_6$    | 32.313                 |       |       |
|    |          | $l_6 = 1.105$          |       |       |
|    | $r_7$    | 45.643                 |       |       |
| L4 |          | $d_7 = 3.200$          | 1.713 | 53.83 |
|    | $r_8$    | 117.150                |       |       |
|    |          | $l_8 = 0.700$ to 49.560 |       |       |
|    | $r_9$    | 22.876                 |       |       |
| L5 |          | $d_9 = 6.000$          | 1.744 | 54.77 |
|    | $r_{10}$ | 33.256                 |       |       |
|    |          | $l_{10} = 1.289$       |       |       |
|    | $r_{11}$ | 113.830                |       |       |
| L6 |          | $d_{11} = 1.200$       | 1.648 | 33.05 |
|    | $r_{12}$ | 22.549                 |       |       |
|    |          | $l_{12} = 12.400$      |       |       |
|    | $r_{13}$ | 73.388                 |       |       |
| L7 |          | $d_{13} = 3.000$       | 1.744 | 54.77 |
|    | $r_{14}$ | −570.490               |       |       | wherein r represents the radii of curvature of the individual lenses, d their axial thicknesses, l the air spaces between the lenses, nd the indices of refraction and $v$ the abbe's coefficient of the lenses.

* * * * *